US008891964B2

(12) United States Patent
Cvijetic et al.

(10) Patent No.: US 8,891,964 B2
(45) Date of Patent: Nov. 18, 2014

(54) DYNAMIC MULTIDIMENSIONAL OPTICAL NETWORKING BASED ON SPATIAL AND SPECTRAL PROCESSING

(71) Applicant: NEC Laboratories America, Inc., Princeton, NJ (US)

(72) Inventors: Milorad Cvijetic, Tucson, AZ (US);
Ivan B. Djordjevic, Tucson, AZ (US);
Neda Cvijetic, Plainsboro, NJ (US);
Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 222 days.

(21) Appl. No.: 13/712,465

(22) Filed: Dec. 12, 2012

(65) Prior Publication Data
US 2013/0148963 A1 Jun. 13, 2013

Related U.S. Application Data

(60) Provisional application No. 61/569,412, filed on Dec. 12, 2011.

(51) Int. Cl.
*H04J 14/00* (2006.01)
*H04J 14/04* (2006.01)
*H04B 10/2581* (2013.01)
*H04B 10/532* (2013.01)
*H04B 10/548* (2013.01)

(52) U.S. Cl.
CPC ............ *H04J 14/04* (2013.01); *H04B 10/2581* (2013.01); *H04B 10/532* (2013.01); *H04B 10/548* (2013.01)
USPC .................. 398/45; 398/48; 398/55; 398/56; 398/57; 398/76; 398/79; 398/89; 398/142; 398/143; 398/183

(58) Field of Classification Search
USPC ............ 398/45–57, 76, 79, 89, 142, 143, 183
See application file for complete search history.

(56) References Cited

U.S. PATENT DOCUMENTS

| 6,925,258 | B2* | 8/2005 | Lo ................................... 398/47 |
| 8,355,638 | B2* | 1/2013 | Essiambre et al. ........... 398/208 |
| 8,391,655 | B2* | 3/2013 | Ryf ................................. 385/29 |
| 8,515,278 | B2* | 8/2013 | Cheng et al. .................... 398/44 |
| 8,538,275 | B2* | 9/2013 | Essiambre et al. ........... 398/201 |
| 2002/0034191 | A1* | 3/2002 | Shattil .......................... 370/464 |
| 2009/0282314 | A1* | 11/2009 | Djordjevic et al. ........... 714/755 |
| 2010/0211849 | A1* | 8/2010 | Djordjevic et al. ........... 714/755 |
| 2010/0232804 | A1* | 9/2010 | Djordjevic et al. ........... 398/152 |
| 2010/0329670 | A1* | 12/2010 | Essiambre et al. .............. 398/43 |
| 2010/0329671 | A1* | 12/2010 | Essiambre et al. .............. 398/44 |
| 2012/0224861 | A1* | 9/2012 | Winzer et al. ................. 398/143 |
| 2012/0230687 | A1* | 9/2012 | Okamoto et al. ............... 398/44 |

OTHER PUBLICATIONS

Zhu et al: "Seven-core multicore fiber transmissions for passive optical network", Optics Express, vol. 18, Mo. 11, May 24, 2010, pp. 11117-11122.*

* cited by examiner

Primary Examiner — Li Liu
(74) Attorney, Agent, or Firm — Joseph Kolodka

(57) ABSTRACT

An optical network includes a multidimensional coder and modulator for handling multiple-in-multiple-out MIMO spatial lightpath properties and content of any specific supercarrier, a spatial mode multiplexer responsive to orthogonal frequency division multiplexing OFDM transmissions and the multidimensional coder, a spatial-spectral routing node coupled over a fiber link to the spatial mode multiplexer for performing switching granularity by a spatial mode reconnection, a multidimensional decoder and demodulator; and a spatial mode demultiplexer coupled over a fiber link to the spatial-spectral routing node and responsive to the multidimensional decoder and demodulator.

13 Claims, 3 Drawing Sheets

DYNAMIC MULTIDIMENSIONAL OPTICAL NETWORKING BASED ON SPATIAL AND SPECTRAL PROCESSING

RELATED APPLICATION INFORMATION

This application claims priority to provisional application No. 61/569,412 filed Dec. 12, 2012, the contents thereof are incorporated herein by reference.

BACKGROUND OF THE INVENTION

The present invention relates generally to optical communications, and more particularly, to dynamic multidimensional optical networking based on spatial and spectral processing.

In current optical networks, the need to establish lightpaths in arbitrary directions, and switch them on-demand has led to the adoption of photonic routing devices mostly in the form of reconfigurable optical add-drop multiplexers (ROADM), and photonic crossconnects (PXC). With such technologies, optical switching and routing can be done at or above the per-wavelength level (i.e. "at the fiber level"). However, these optical switching and routing principles can only operate at per-wavelength or per-fiber granularity, which significantly limits flexibility and reduces bandwidth efficiency in future mixed-rate, heterogeneous optical networks with predominantly dynamic traffic demands. For example, switching at fiber-level granularity may cause unnecessary re-direction of certain wavelengths, which can result in substantial bandwidth waste. Conversely, switching at the wavelength level enables finer granularity, but could insert unnecessary complexity to the overall ROADM design.

Switching at interim granularity, so called "waveband switching", has been considered for some time as a more practical alternative. However, this previously proposed concept has assumed that waveband consists of a number of wavelengths aligned to an ITU-T defined wavelength grid. With the introduction of optical orthogonal frequency division multiplexing (OFDM), novel frequency-domain degrees of freedom have been added to the waveband switching approach, and are exploited in this work. Moreover, with the advent of multicore and multimode optical fibers for throughput maximization, coarse switching at the fiber level may now require that the overall wavelength spectrum be switched not just from one fiber to another, but from one fiber core to another. While previous work has considered physical-layer benefits of multimode and multicore fiber transmission, to the best of our knowledge, no previous work exists on exploiting this spatial dimension for optical networking (i.e. switching and routing).

Accordingly, there is a need for. dynamic multidimensional optical networking based on spatial and spectral processing

BRIEF SUMMARY OF THE INVENTION

The present invention is directed to an optical network including a multidimensional coder and modulator for handling multiple-in-multiple-out MIMO spatial lightpath properties and content of any specific supercarrier, a spatial mode multiplexer responsive to orthogonal frequency division multiplexing OFDM transmissions and the multidimensional coder, a spatial-spectral routing node coupled over a fiber link to the spatial mode multiplexer for performing switching granularity by a spatial mode reconnection, a multidimensional decoder and demodulator; and a spatial mode demultiplexer coupled over a fiber link to the spatial-spectral routing node and responsive to the multidimensional decoder and demodulator.

These and other advantages of the invention will be apparent to those of ordinary skill in the art by reference to the following detailed description and the accompanying drawings.

DETAILED DESCRIPTION

The invention introduces and develops a logical hierarchical structure for next generation dynamic optical networking based on novel spatial and frequency domain switching and routing functionalities. The roles of spatial multiple input multiple output (MIMO) techniques and OFDM super/sub carriers are defined, as well as the impact of advanced coded modulation, which represents the third cornerstone in the proposed multidimensional and dynamic networking concept. Finally, to enable the dynamic spatial and spectral domain optical networking discussed above, a judicious selection of modulation formats and forward error correction (FEC) schemes is highly important. For example, while certain longer lightpaths might require higher robustness with respect to the optical signal to noise ratio (OSNR), for others, the key priority might be higher spectral efficiency. Consequently, a distance versus information capacity trade-off emerges that is handled via multidimensional coded modulation in the present invention.

Figure 1:
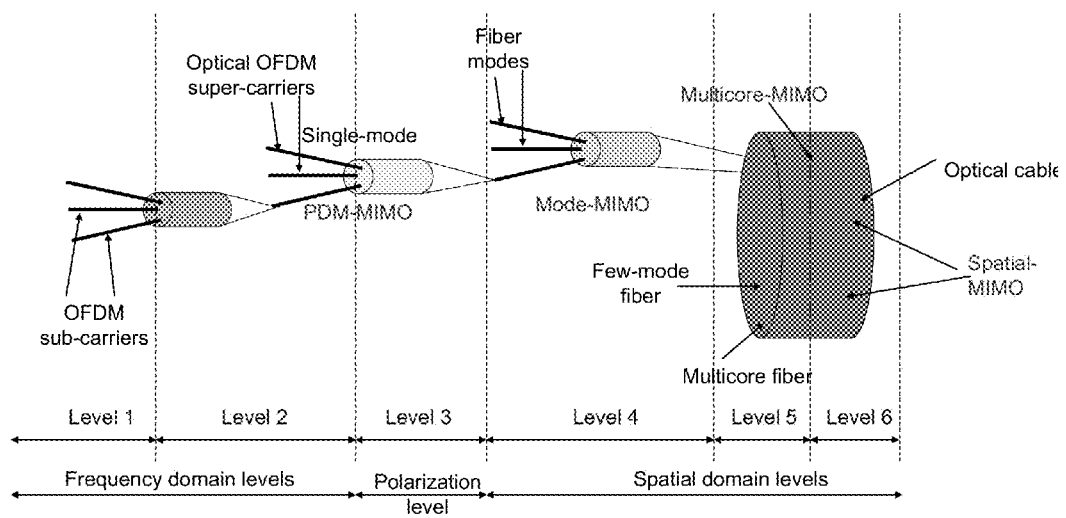
FIG. 1 shows an exemplary multidimensional (spatial and spectral) multiplexing hierarchy for dynamic optical networking, in accordance with the invention.

The fundamental structure of a bandwidth granularity and multiplexing hierarchy at the entrance point of any specific optical fiber transmission line is shown in FIG. 1. It is noted that the utilized optical fiber type can be arbitrary, including single mode or multimode, operating within either single core or multicore fiber links. As shown in FIG. 1, a number of independent lightpaths can be established through each fiber. In the case of a single mode optical fiber, two polarizations can be utilized to carry two independent signal streams. In multimode optical fibers, a number of independent spatial modes can also be excited at the input of the fiber line. Each spatial mode can also carry two independent polarizations. Furthermore, each independent lightpath can consist of multiple dense wavelength division multiplexed (DWDM) channels, each featuring a specific modulation and coding scheme. The most interesting case from the networking perspective is the scenario wherein OFDM (both in the all-optical and electronic domains) is adopted on optical channels.

Based on the above architecture (FIG. 1), several new dimensions for signal grooming, multiplexing, and routing emerge, and can be classified under two general categories (spatial and spectral), and can all be utilized as novel optical networking tools:

1. Spatial domain schemes:
   i. Optical fibers as transmission entities (Level 6 from FIG. 1)
   ii. Spatial arrangement (multiplexing) of lightpaths arising from spatial MIMO technique (Levels 3,4,5 from FIG. 1)
2. Spectral (frequency) domain schemes:
   iii. Spectral arrangements within individual lightpaths that could have ITU-T DWDM MUX structure, or supercarrier-based all-optical OFDM scheme (Level 2 from FIG. 1)
   iv. OFDM subcarrier arrangement within a specific carrier, with the modulation and signal processing performed at the electrical level (Level 1 from FIG. 1).

Figure 2:
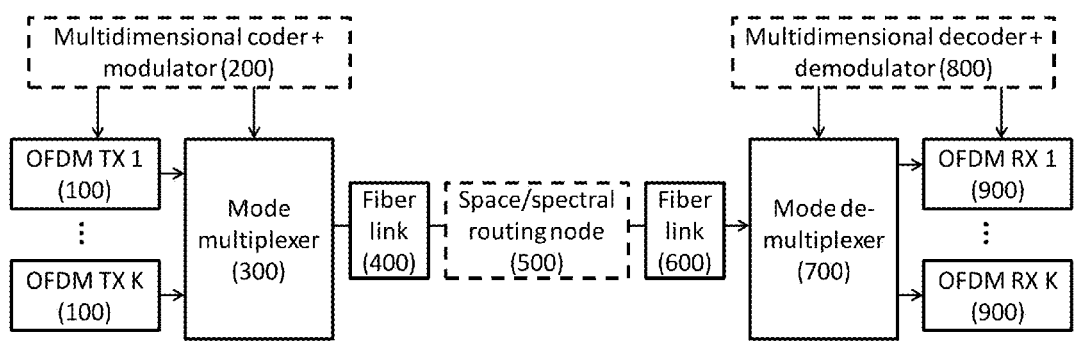
FIG. 2 is a an exemplary multidimensional (spatial+spectral) dynamic configuration in accordance with the invention.
Figure 3:
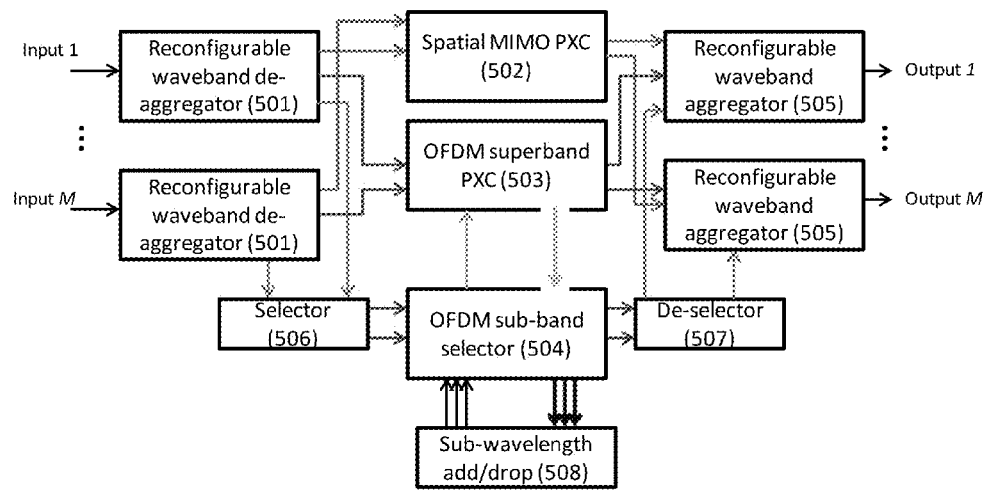
FIG. 3 is a block diagram of a spatial/spectral routing node introduced in FIG. 2.

FIG. 2 illustrates the claim tree diagram for the proposed networking architecture based on the multidimensional hierarchy of FIG. 1, using electrical and/or all-optical OFDM modulation (100), multidimensional coding (200) and spatial mode multiplexing (300). The novel spatial and spectral switching and routing functionality is achieved in the multidimensional routing node (500). At the receiver side, mode de-multiplexing (700), multidimensional decoding and demodulation (800) and OFDM demodulation (900) are performed to recover the desired data streams. The employment of spatial and spectral schemes in optical networks is also illustrated in FIG. 2. As shown, the OFDM approach is used at the optical transmission side with both frequency and spatial multiplexing applied. We assume that few mode fiber (FMF) will be eventually widely utilized, which permits that add-drop multiplexers and crossconnects are applied at both spectral and spatial level. The photonic cross-connect function is done at the spectral level, where both a single wavelength and waveband can be switched in any specific direction. The detailed block diagram of the spatial-spectral optical routing node (500) is shown in FIG. 3. The design of such a node means that, from the spectral side, employment of tunable lasers is needed for wavelength grooming into a band, and the use of tunable filters is needed for selection of the specific band. At the same time, a mode connection/conversion scheme is needed from the spatial side.

In a first embodiment of FIG. 2, multicore optical fibers are exploited. From the optical networking perspective, switching between individual cores in optical fibers could be compared to switching happening at smart patch panels. Some cores can be utilized for connections between add/drop sites, while others can be exploited for through-traffic. Multicore optical fibers can thus be treated as a "close-up" picture of fiber-level switching for optical cables. However, compact drop/continue and add/drop devices that are compatible with multicore fibers would be required. It is expected that these will be developed in the future, once multicore fibers application gain momentum.

In a second embodiment of FIG. 2, multimode (or more specifically few-mode) fibers are used. In this case, there is also significant networking potential in the spatial domain multiplexing. For example, if we assume that mode launch and detection can be accomplished by compact spatial multiplexers/demultiplexers, known from prior art, we can envision the following scenario: mode $LP_{01}$, carrying a polarization-multiplexed signal, can be coupled to $LP_{01}$ again, or switched to mode $LP_{11}$. In both cases modes will be assigned for through traffic, while mode $LP_{21}$ and a possibly couple more higher order modes can be assigned for shorter add/drop paths. Add/drop MUX design thus includes spatial arrangement for extraction and introduction of specific modes, while fiber tapering can be used for easier fiber connections.

To enable the spectral domain networking proposed here, instead of fixed grid, a flexible grid or even "gridless" spectral arrangement is used to provide much more flexibility from a networking perspective, since an arbitrary portion of the spectrum could be selected and routed on-demand in a designated direction. Therefore, future routing devices should have the capability of routing optical spectrum slots. The ITU-T grid definition can stay in place for the reference purposes, but this time the spectrum between two neighboring wavelength grid points is subject to optical routing. The same approach currently suggested for flexible grid handling could be eventually used for dynamic switching and routing of spectrum slots. Moreover, the employment of wavelength agile devices (i.e. tunable lasers and filters) will enable flexible wavelength grooming and routing. Tunable lasers should have tuning speed on the microsecond level to enable spectral arrangement per request, while tunable filters should possess comparable tuning speed with respect to both the central wavelength and in the band-pass region.

The aggregate design of space-spectrum routing node (500) based on spatial MIMO and OFDM super/subband selection, as shown in FIG. 3, performs the highest switching granularity by spatial mode reconnection. We assume that FMF will be the most attractive as transmission medium, and therefore mode convertor can perform the function of dynamic spatial reconfiguration. The spectral portion of the photonic crossconnect contains superwaveband/supercarrier, wavelength, and sub band/subcarrier granularities. The important part of the scheme is super-waveband aggregator/deaggregator, and the waveband selector. The aggregator/deaggregator would take care of superchannel arrangement within a specific band, while the waveband selector would select the appropriate dropped wavebands and forward them for electronic processing and spectral selection at the subband level. The spatial-spectral routing node of FIG. 3 maintains a generic hierarchical structure. However, a significant difference emerges in the interpretation of both space and spectrum. Specifically, in this case, space represents a spatial mode rather than the physical fiber itself, and spectrum denotes a spectral band rather than a group of aggregated ITU-T wavelengths.

Multidimensional coded modulation, the third aspect of the proposed invention, employs all available degrees of freedom; namely, amplitude, phase polarization, orthogonal subcarriers and orbital angular momentum (OAM). The properties of hybrid multidimensional schemes are the best suited to handle MIMO spatial lightpath properties, as well as the content of any specific supercarrier. By increasing the number of dimensions, we can increase the aggregate data rate of the system while ensuring reliable transmission at these ultra-high speeds using capacity-approaching low density parity check (LDPC) codes. Apart from increasing the aggregate data rate, a D-dimensional space when compared to the conventional two-dimensional (2D) space can provide larger Euclidean distances between signal constellation points, resulting in improved BER performance.

Figure 4:
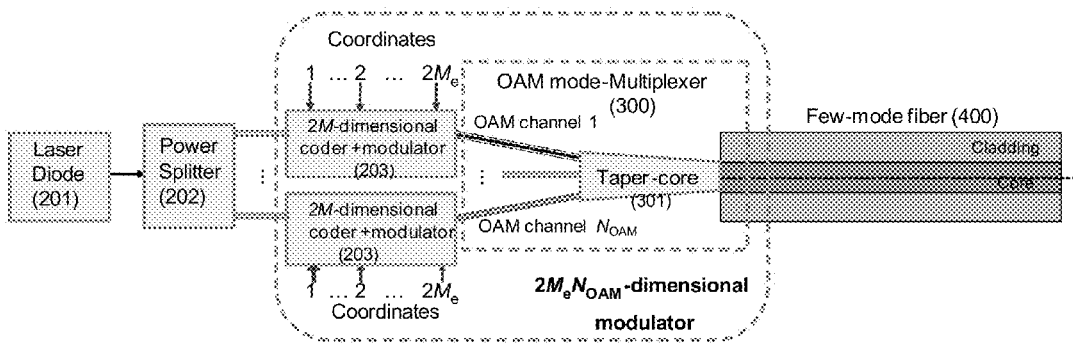
FIG. 4 is an exemplary diagram of a multidimensional coder and modulator transmitter-side configuration and its interface to a node multiplexer and fiber link, introduced in FIG. 2.

The multidimensional coder and modulator (200) transmitter-side architecture is shown in FIG. 4. A continuous wave laser diode signal is split into N branches by using a power splitter (such as 1:N star coupler) to feed $2M_e$-dimensional electro-optical modulators, each corresponding to one out of $N_{OAM}$ OAM modes. The $2M_e$-dimensional electro-optical modulator is implemented by imposing $M_e$ electrical coordinates per polarization mode. The OAM mode multiplexer is composed of $N_{OAM}$ waveguides, taper-core fiber and MMF, properly designed to excite orthogonal OAM modes in MMF. The $M_e$ signal-constellation point coordinates after up-sampling are passed through corresponding DT pulse-shaping filters, whose outputs are combined together into a single complex data stream. The real and imaginary parts of this complex data stream, after DAC, drive RF inputs of I/Q modulator. To facilitate this implementation, few mode fibers should be developed, which is an active research topic. The $2M_e$-dimensional modulator outputs are combined into a single OAM stream by the polarization beam combiner (PBC). The $N_{OAM}$ OAM streams, such obtained, are combined by the OAM mode-multiplexer as described above.

Figure 5:
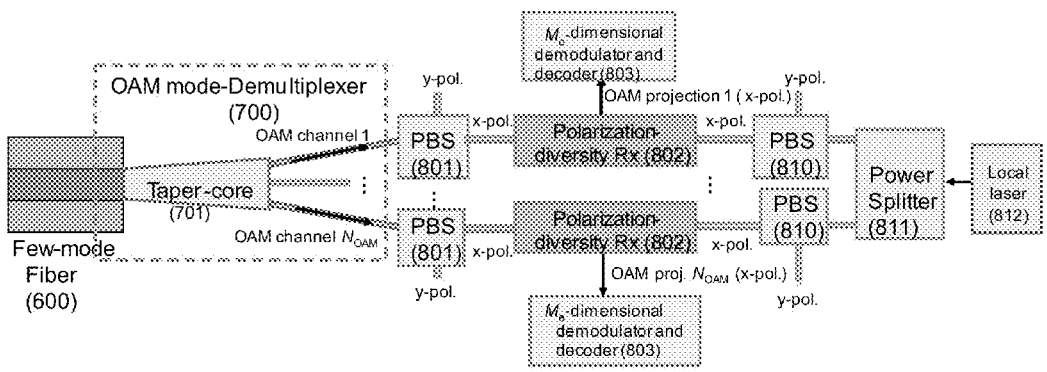
FIG. 5 is an exemplary diagram of a multidimensional decoder and demodulator receiver-side configuration and its interface to a demultiplexer and fiber link, introduced in FIG. 2,n

The $2M_e N_{OAM}$-dimensional demodulator architecture (800) is shown in FIG. 5. We first perform OAM mode-demultiplexing in the OAM-demux block, whose outputs are $2M_e$-dimensional projections along $N_{OAM}$ states. Each OAM mode undergoes polarization-diversity coherent detection and corresponding outputs are forwarded to $M_e$-dimensional electrical demodulators. After polarization-diversity detection, the in-phase and quadrature parts are recovered, which are subsequently combined into a single complex data stream. The same complex data stream is applied to the inputs of $M_e$ matched filters. The corresponding outputs after re-sampling represent projections along basis functions $\Phi_m$. At this point all D-coordinates of a transmitted D-dimensional signal constellation points are estimated.

Figure 6:
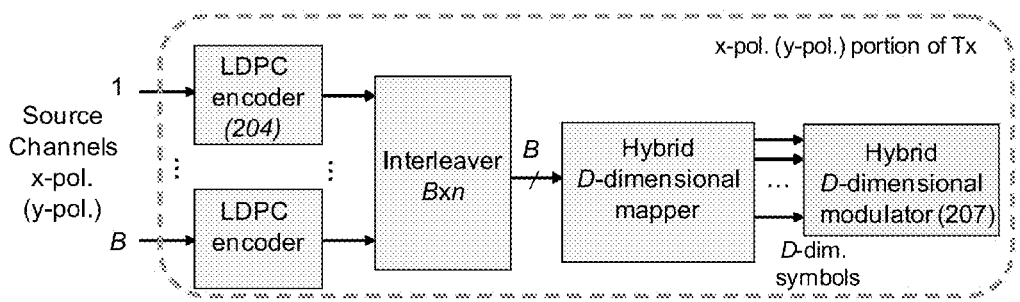
FIG. 6 is block diagram of detailed operational aspects of a multidimensional code modulator, introduced in FIG. 2.
Figure 7:
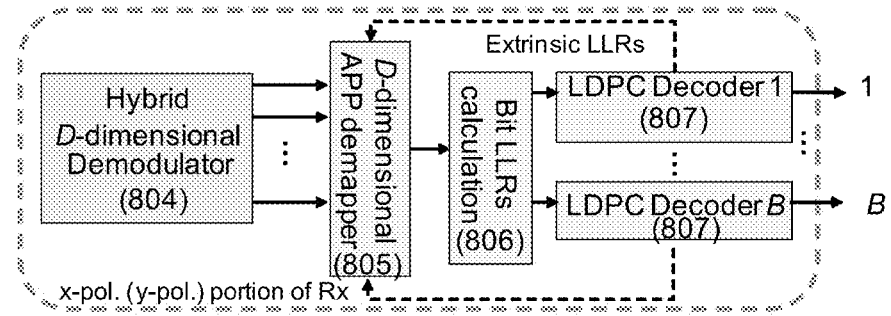
FIG. 7 is a block diagram of detailed operational aspects of a multidimensional decoder and demodulator, introduced in FIG. 2.

The detailed operational principle of multidimensional coded-modulator (203) is depicted in FIG. 6. Independent binary streams are LDPC encoded, with corresponding codeword being written row-wise into block-interleaver. The B bits are taken column-wise from block-interleaver and used to select the coordinates of corresponding D-dimensional signal constellation. The output of D-dimensional modulator is transmitted over transmission system of interest. At the receiver side, as shown in FIG. 7, after D-dimensional demodulation, the outputs of the D branches of the demodulator are forwarded to the APP demapper. The i-th branch in FIG. 7 represents the projection along i-th coordinate. The projections are used as input of the aposteriori probability (APP) demapper, in which symbol log likelihood ratios (LLRs) are calculated. After that in bit LLRs calculation block, the bit LLRs needed for LDPC decoding are calculated based on symbol LLRs. We further iterate the extrinsic information among LDPC decoders and APP demapper, until valid codewords are obtained or pre-determined number of iterations has been reached.

From the foregoing it can be appreciated that the invention achieves much higher bandwidth flexibility and efficiency compared to previous optical switching and routing techniques, by exploiting novel spatial and spectral domains in optical fiber. The spatial multiplexing domain (i.e. via the use of multiple core and/or multiple modes in optical fibers) thus emerges as a novel and appealing networking tool, closely related to MIMO processing techniques. Moreover, OFDM supercarriers (in all-optical OFDM) and subcarriers (in electronic-based OFDM), together with individual wavelengths, can be considered as spectral (i.e. frequency-domain) contributors to optical networking that enable the spectral efficiency and granularity benefits outlined above.

The inventive spectral and spatial domains emerge for physical-layer transmission, defined by OFDM and spatial MIMO techniques. However, in prior art, these techniques were not exploited for dynamic optical networking. In this solution, we have introduced and developed a hierarchy for exploiting these new degrees of freedom for flexible switching, routing and dynamic lightpath assignment. Specifically, spatial-domain lightpath routing in multicore and multimode (specifically, few-mode) fibers was discussed, as well as dynamic signal grooming by all-optical and electrical OFDM techniques, and its integration with multidimensional coded modulation. The new and different parts of the solution are thus the function blocks of (200), (500), and (800) in FIG. 1.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An optical network comprising:
    a multidimensional coder and modulator for handling multiple-in-multiple-out MIMO spatial lightpath properties and content of any specific supercarrier;
    a spatial mode multiplexer responsive to orthogonal frequency division multiplexing OFDM transmissions and said multidimensional coder;
    a spatial-spectral routing node coupled over a fiber link to said spatial mode multiplexer for performing switching granularity by a spatial mode reconnection;
    a multidimensional decoder and demodulator; and
    a spatial mode demultiplexer coupled over a fiber link to said spatial-spectral routing node and responsive to said multidimensional decoder and demodulator,
    wherein said spatial-spectral routing node comprises tunable lasers for wavelength grooming into a band, tunable filters for selection of a specific band and a mode-connection conversion scheme from a spatial side;
    wherein said multidimensional coder and modulator comprises a continuous wave laser diode signal being split into N branches by using a power splitter to feed $2M_e$-dimensional electro-optical modulators, each corresponding to one out of $N_{OAM}$ orbital angular momentum OAM modes.

2. The optical network of claim 1, wherein said spatial-spectral routing node comprises a super-waveband aggregator-deaggregator and waveband selector.

3. The optical network of claim 2, wherein said aggregator-deaggregator comprises taking care of a superchannel arrangement within a specific band.

4. The optical network of claim 2, wherein said while said waveband selector comprises selecting appropriate dropped wavebands and forward them for electronic processing and spectral selection at a subband level.

5. The optical network of claim 1, wherein said $2M_e$-dimensional electro-optical modulator comprises being implemented by imposing $M_e$ electrical coordinates per polarization mode.

6. The optical network of claim 1, comprising an orbital angular momentum OAM mode multiplexer including $N_{OAM}$ waveguides, a taper-core fiber and multimode fiber MMF, configured to excite orthogonal OAM modes in said MMF.

7. The optical network of claim 6, wherein $M_e$ signal-constellation point coordinates after up-sampling are passed through corresponding discrete-time DT pulse-shaping filters whose outputs are combined together into a single complex data stream, real and imaginary parts of said complex data stream, after digital-to-analog conversion DAC, drive radio frequency RF inputs of an in-phase quadrature-phase I/Q modulator, said $2M_e$-dimensional modulator outputs are combined into a single OAM stream by the polarization beam combiner (PBC).

8. The optical network of claim 1, wherein said multidimensional decoder and demodulator comprises first performing orbital angular momentum OAM mode-demultiplexing in an OAM-demux block, whose outputs are $2M_e$-dimensional projections along $N_{OAM}$ OAM states.

9. The optical network of claim 8, wherein each said OAM mode-demultiplexing undergoes polarization-diversity coherent detection and corresponding outputs are forwarded to $M_e$-dimensional electrical demodulators, after polarization-diversity detection, in-phase and quadrature parts are recovered, which are subsequently combined into a single complex data stream.

10. The optical network of claim 9, wherein said complex data stream is applied to the inputs of $M_e$ matched filters and corresponding outputs after re-sampling represent projections along basis functions $\Phi_m$ and all D-coordinates of a transmitted D-dimensional signal constellation points are estimated.

11. The optical network of claim 1, wherein said multidimensional coder and modulator comprises independent binary streams being low density parity-check LDPC encoded, with corresponding codeword being written row-wise into a block-interleaver, with B bits being taken column-wise from a block-interleaver and used to select the coordinates of a corresponding D-dimensional signal constellation and output of a D-dimensional modulator being transmittable.

12. The optical network of claim 11, wherein said multidimensional decoder and demodulator comprises, after D-dimensional demodulation, outputs of D branches of demodulation are forwarded to an aposteriori probability APP demapper with, an i-th branch represents a projection aposteriori probability (along i-th coordinate, projections being used as an input of an APP demapper, in which symbol log likelihood ratios LLRs are calculated and bit LLRs needed for low density parity-check LDPC decoding are calculated based on symbol LLRs.

13. The optical network of claim 12, further comprising iterating extrinsic information among said LDPC decoding and APP demapper, until valid codewords are obtained or a pre-determined number of iterations has been reached.

* * * * *